US012606210B2

(12) United States Patent
Kondo

(10) Patent No.: US 12,606,210 B2
(45) Date of Patent: Apr. 21, 2026

(54) INFORMATION PROCESSING APPARATUS, INFORMATION PROCESSING METHOD, AND PROGRAM CAPABLE OF CORRECTING OPERATION PLAN OF VEHICLE

(71) Applicant: TOYOTA JIDOSHA KABUSHIKI KAISHA, Toyota (JP)

(72) Inventor: Kenji Kondo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/455,164

(22) Filed: Aug. 24, 2023

(65) Prior Publication Data

US 2024/0075958 A1 Mar. 7, 2024

(30) Foreign Application Priority Data

Sep. 1, 2022 (JP) ................................. 2022-139474

(51) Int. Cl.
*B60W 60/00* (2020.01)
*G06Q 10/0631* (2023.01)
(52) U.S. Cl.
CPC . *B60W 60/0021* (2020.02); *G06Q 10/063116* (2013.01); *B60W 2556/50* (2020.02)
(58) Field of Classification Search
CPC .......... B60W 60/0021; B60W 60/001; B60W 60/0025; B60W 60/00256;
(Continued)

(56) References Cited

U.S. PATENT DOCUMENTS 6,339,397 B1 * 1/2002 Baker ................... B61L 25/025
343/872
11,252,154 B2 * 2/2022 Chun ...................... H04L 67/52
(Continued)

FOREIGN PATENT DOCUMENTS

DE 202015004890 U1 * 10/2016 ................ H02J 7/14
JP 2015-138501 A 7/2015
JP 6972295 B2 11/2021

OTHER PUBLICATIONS

M. Krész et al., "A model and fast heuristics for the multiple depot bus rescheduling problem", Aug. 2014, 10th International Conference of the Practice and Theory of Automated Timetabling, PATAT 2014, pp. 128-141 (Year: 2014).*
(Continued)

*Primary Examiner* — Erin M Piateski
*Assistant Examiner* — Ashley Tiffany Schoech
(74) *Attorney, Agent, or Firm* — Oliff PLC

(57) ABSTRACT

An information processing apparatus, comprises a controller configured to execute: issuing a first command to a first vehicle that is an autonomous driving vehicle, based on a predetermined operation plan that includes an operation zone for providing a predetermined service, and a non-operation zone for executing one or more preparation tasks; correcting an execution plan of the one or more preparation tasks included in the operation plan, based on a predetermined condition so as to reduce time to be spent in the non-operation zone, if the predetermined operation plan is delayed with respect to the first vehicle entering the non-operation zone from the operation zone; and issuing a second command based on the corrected operation plan.

20 Claims, 18 Drawing Sheets

(58) Field of Classification Search
CPC ..... B60W 60/00259; B60W 60/00253; B60W
60/0023; G06Q 10/06311; G06Q 10/083
See application file for complete search history.

(56) References Cited

U.S. PATENT DOCUMENTS

| | | | |
|---|---|---|---|
| 2016/0251000 A1* | 9/2016 | Loman .................... | B60S 1/603 |
| | | | 137/1 |
| 2018/0321326 A1* | 11/2018 | Tanaka ............... | G01R 31/3842 |
| 2019/0066516 A1* | 2/2019 | Kuhara ................. | G08G 1/202 |
| 2019/0101918 A1* | 4/2019 | Mukaiyama ........... | G06Q 10/00 |
| 2020/0160709 A1* | 5/2020 | Ramot ................. | G06Q 10/047 |
| 2021/0107509 A1 | 4/2021 | Hirose et al. | |
| 2022/0270057 A1* | 8/2022 | Wu ........................ | G06Q 50/40 |
| 2023/0410029 A1* | 12/2023 | Prasad .............. | G06Q 10/0838 |

OTHER PUBLICATIONS

M. Visentini et al., "Review of real-time vehicle schedule recovery
methods in transportation services", Nov. 10, 2011, Springer Sci-
ence Business Media New York, J Sched (2014) 17, pp. 541-567
(Year: 2011).*

* cited by examiner

USER APPARATUS 100

| SERVICE REQUEST | | | SERVICE CONTENT | | | |
|---|---|---|---|---|---|---|
| USER ID | REQUEST DATE AND TIME | REQUEST ID | SERVICE TYPE | INTENDED BOARDING POINT | INTENDED BOARDING TIME | INTENDED ALIGHTING POINT | |
| U001 | … | R001 | BUS | … | … | … | … |

FIG. 3

CONDITION DATA

| SITE ID | TYPE OF PREPARATION TASK | REQUIRED TIME | OMISSION CONDITION | REDUCTION CONDITION | ⋮ |
|---------|--------------------------|---------------|--------------------|--------------------|---|
| B0001 | CLEANING | 30 MINUTES | IF CLEANING LEVEL IS 4 OR HIGHER, OMISSION IS ALLOWED | IF CLEANING LEVEL IS 3 OR HIGHER, REDUCTION TO 10 MINUTES IS ALLOWED | ⋮ |
| B0001 | CHARGING | 30 MINUTES | IF DIFFERENCE FROM TARGET AMOUNT OF CHARGE IS 10% OR LESS, OMISSION IS ALLOWED | IF DIFFERENCE FROM TARGET AMOUNT OF CHARGE IS 30% OR LESS, REDUCTION TO 15 MINUTES IS ALLOWED | ⋮ |
| B0001 | STANDBY | - | N/A | N/A | ⋮ |
| ⋮ | ⋮ | | ⋮ | ⋮ | |

FIG. 7

SITE DATA

| SITE ID | POSITION INFORMATION | PARKING AVAILABILITY INFORMATION | TYPE OF PRE- PARATION TASK | |
|---|---|---|---|---|
| B0001 | ∶ | ∶ | CLEANING, CHARGING, STANDBY | ∶ |
| B0002 | ∶ | ∶ | CHARGING, STANDBY | ∶ |
| B0003 | ∶ | ∶ | CLEANING, STANDBY | ∶ |
| ∶ | ∶ | ∶ | ∶ | ∶ |

FIG. 8

VEHICLE DATA

| VEHICLE ID | DATE AND TIME INFORMATION | POSITION INFORMATION | TASK PROCESSING STATE | ... |
|---|---|---|---|---|
| V00001 | X | ... | ... | ... |

FIG. 9

OPERATION COMMAND

| VEHICLE ID | V001 |
|---|---|
| DATE AND TIME INFORMATION | ... |
| OPERATION ID | X001 |
| TASK1 | TRAVEL FROM SITE X1 TO POINT X2 |
| TASK2 | PICK UP USER A |
| TASK3 | TRAVEL TO POINT X3 |
| TASK4 | DROP USER A |
| TASK5 | TRAVEL FROM POINT X3 TO SITE X2 |
| TASK6 | EXECUTE CHARGING (30 MINS) |
| ... | ... |

FIG. 11

INFORMATION PROCESSING APPARATUS, INFORMATION PROCESSING METHOD, AND PROGRAM CAPABLE OF CORRECTING OPERATION PLAN OF VEHICLE

CROSS REFERENCE TO THE RELATED APPLICATION

This application claims the benefit of Japanese Patent Application No. 2022-139474, filed on Sep. 1, 2022, which is hereby incorporated by reference herein in its entirety.

BACKGROUND

Technical Field

The present disclosure relates to service providing by a vehicle.

Description of the Related Art

Systems that provide services for users using a plurality of vehicles use a technique for making appropriate operation plans of vehicles.

As to this technique, for example, Japanese Patent Laid-Open No. 2015-138501 discloses a system that predicts the travel distance and power consumption of a vehicle in order to generate a charging plan of an electric vehicle.

SUMMARY

The present disclosure has an object to appropriately correct an operation plan of a vehicle.

The present disclosure in its one aspect provides an information processing apparatus, comprising a controller configured to execute: issuing a first command to a first vehicle that is an autonomous driving vehicle, based on a predetermined operation plan that includes an operation zone for providing a predetermined service, and a non-operation zone for executing one or more preparation tasks; correcting an execution plan of the one or more preparation tasks included in the operation plan, based on a predetermined condition so as to reduce time to be spent in the non-operation zone, if the predetermined operation plan is delayed with respect to the first vehicle entering the non-operation zone from the operation zone; and issuing a second command based on the corrected operation plan.

The present disclosure in its another aspect provides an information processing method, comprising: a step of issuing a first command to a first vehicle that is an autonomous driving vehicle, based on a predetermined operation plan that includes an operation zone for providing a predetermined service, and a non-operation zone for executing one or more preparation tasks; a step of correcting an execution plan of the one or more preparation tasks included in the operation plan, based on a predetermined condition so as to reduce time to be spent in the non-operation zone, if the predetermined operation plan is delayed with respect to the first vehicle entering the non-operation zone from the operation zone; and a step of issuing a second command based on the corrected operation plan.

The present disclosure in its another aspect provides an information processing system, comprising: a first information processing apparatus that manages a first vehicle; and a second information processing apparatus mounted on the first vehicle, wherein the first information processing apparatus ratus executes: issuing a first command to the second information processing apparatus, based on a predetermined operation plan that includes an operation zone for providing a predetermined service, and a non-operation zone for executing one or more preparation tasks; correcting an execution plan of the one or more preparation tasks included in the operation plan, based on a predetermined condition so as to reduce time to be spent in the non-operation zone, if the predetermined operation plan is delayed with respect to the first vehicle entering the non-operation zone from the operation zone; and issuing a second command based on the corrected operation plan, to the second information processing apparatus, and the second information processing apparatus executes: causing the first vehicle to execute the tasks, based on the command; and overwriting the second command on the tasks in execution, upon receipt of the second command.

Another aspect is a program for causing a computer to execute the method described above, or a computer-readable storage medium that non-transitorily stores the program.

According to the present disclosure, the operation plan of the vehicle can be appropriately corrected.

BRIEF DESCRIPTION OF THE DRAWINGS

FIG. 3 illustrates an example of a service request transmitted from the user apparatus;

FIG. 7 illustrates an example of condition data managed by the control server;

FIG. 8 illustrates an example of site data managed by the control server;

FIG. 9 illustrates an example of vehicle data managed by the control server;

FIG. 11 illustrates an example of an operation command generated by the control server;

DESCRIPTION OF THE EMBODIMENTS

Figure 1:
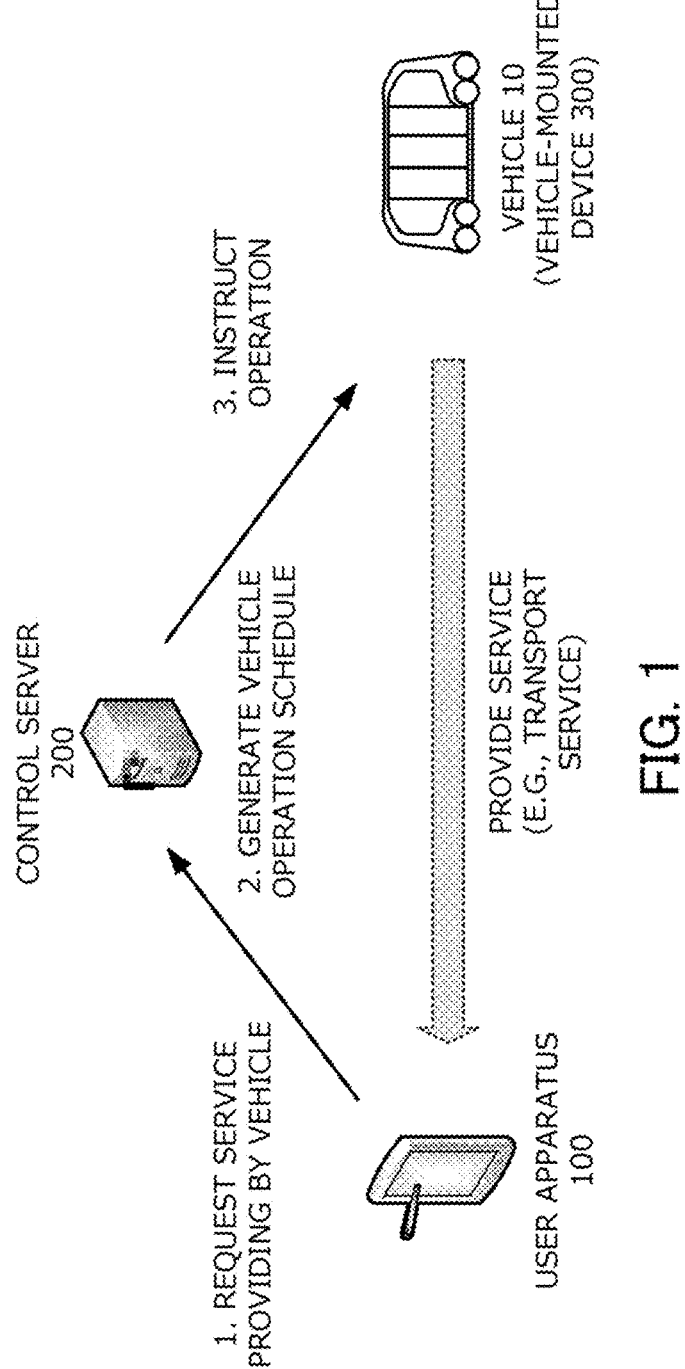
FIG. 1 is a schematic diagram of a vehicle system according to a first embodiment.

A transport system that performs passenger transport by an autonomous driving vehicle has been known. In such a system, a server apparatus that manages operation schedules of a plurality of vehicles generates an operation plan, and issues a command for operation to the vehicle, based on a request by a user and on a predetermined operation diagram.

Typically, the operation plan of vehicles (operation schedule) is generated based on a prediction result of road conditions and the like. Unfortunately, the road conditions are incessantly changing. Accordingly, the vehicles are not necessarily operated according to a predicted schedule.

To solve the problem, a server apparatus that manages the operation of the vehicles is required to correct the operation plan appropriately in accordance with situations.

An information processing apparatus according to a first aspect of the present disclosure includes a controller configured to execute: issuing a first command to a first vehicle that is an autonomous driving vehicle, based on a predetermined operation plan that includes an operation zone for providing a predetermined service, and a non-operation zone for executing one or more preparation tasks; correcting an execution plan of the one or more preparation tasks included in the operation plan, based on a predetermined condition so as to reduce time to be spent in the non-operation zone, when the predetermined operation plan is delayed with respect to the first vehicle entering the non-operation zone from the operation zone; and issuing a second command based on the corrected operation plan.

The predetermined service can include, for example, a plurality of services, such as a passenger transport service, a package transport service, a package storage service, and a mobile shop service.

The operation plan is a vehicle operation schedule, and includes an operation zone, and a non-operation zone. The operation zone is a zone where services are provided for demanders (for example, a zone for performing passenger transport). The non-operation zone is a zone where no service is provided (for example, a vehicle forwarding zone). Note that the zone may be a geographical zone or a temporal zone (time period). The preparation tasks executed in the non-operation zone include examples, such as vehicle forwarding, vehicle cleaning, or vehicle charging, for example. As described above, the preparation tasks are tasks for performing preparation for providing the demanders with services.

The controller determines whether or not the operation plan is delayed concerning the first vehicle entering the non-operation zone from the operation zone, and corrects the execution plan of the preparation tasks included in the operation plan, based on the predetermined condition, in case the delay occurs, thus taking measures for reducing the time to be spent in the non-operation zone.

The predetermined condition is a condition for omitting execution of one or more preparation tasks, or a condition for reducing the execution time period of the one or more preparation tasks from what is originally planned.

For example, if there is an operation plan that includes "charging the vehicle after completion of the operation" for a certain vehicle, and the vehicle has been sufficiently charged, the preparation task of "charging" can sometimes be omitted. Alternatively, the charging time can sometimes be reduced.

If there is an operation plan that includes "cleaning the interior of the vehicle after completion of the operation", and the interior of the vehicle is sufficiently clean, the preparation task of "cleaning" can sometimes be omitted. Alternatively, the execution level of the cleaning operation can sometimes be reduced.

As described above, the controller corrects the execution plan of the preparation tasks included in the operation plan (typically, omits or reduces execution of the preparation tasks) based on the predetermined condition, and issues a second command based on the corrected operation plan. The second command may be what is to be transmitted to the first vehicle, or what is to be transmitted to an apparatus related to the preparation tasks (e.g., an apparatus for charging the vehicle).

Thus, the delay of the schedule can be restored.

Hereinafter, specific embodiments of the present disclosure are described based on the drawings. The hardware configuration, module configuration, functional configuration and the like described in each embodiment are not intended to limit the technical scope of the disclosure only to them unless otherwise described.

First Embodiment

An overview of a vehicle system according to a first embodiment is described with reference to FIG. 1. The vehicle system according to this embodiment is configured to include vehicles 10 each mounted with a vehicle-mounted device 300, user apparatuses 100, and a control server 200. The number of vehicles 10 (vehicle-mounted devices 300) included in the system may be two or more.

The vehicle 10 is an autonomous vehicle that can provide predetermined services for demanders. Examples of the predetermined service include, for example, passenger transport, package transport, package storage, mobile shop providing, working space providing, and sleeping space providing. The vehicle 10 is configured to be capable of wirelessly communicating with the control server 200 via the vehicle-mounted device 300, and is autonomously operated based on an instruction from the control server 200.

A user intending to use the service by the vehicle 10 transmits a service request to the control server 200 via the user apparatus 100. The service request includes, for example, the type of an intended service (e.g., "taxi"), a point and time at which the vehicle 10 is intended to be dispatched, a destination (in a case where the transport service is intended), and a trade name (in a case where the shop service is intended).

For example, these pieces of information can be generated and transmitted by application software that is installed in the user apparatus 100 and is for using the vehicle system. These pieces of information may be generated using a mobile terminal, or generated using any terminal (a smartphone, a mobile phone, a tablet terminal, a personal digital assistant, a wearable computer or the like) or a personal computer that is connectable to a network.

The control server 200 generates an operation schedule of the vehicle 10, based on the service request transmitted from the user apparatus 100. The control server 200 includes a database for managing the operation schedules of a plurality of vehicles 10. When the operation schedule of each vehicle 10 is updated, the control server 200 updates the database. Note that in this Specification, the operation plan, and operation schedule have the same meaning.

Furthermore, the control server 200 transmits data for commanding each vehicle to operate (hereinafter, an operation command) to the target vehicle 10 (vehicle-mounted device 300), based on the updated operation schedule. The operation command is data for instructing the vehicle 10 to perform a plurality of tasks: for example, "travel to a predetermined point A", "allow a user to board", "travel to a predetermined point B", "allow the user to alight", and "return to the vehicle site".

The operation command may include a scheduled time about execution of each task.

The vehicle-mounted device 300 receives the operation command from the control server 200. In a case where the vehicle 10 is an autonomous vehicle, the operation command is transmitted to a device that is mounted on the vehicle 10 and controls autonomous travel. Note that the vehicle 10 may be a crewed vehicle. In this case, the operation command is provided for a crew via the vehicle-mounted device 300.

In the vehicle system according to this embodiment, a plurality of user apparatuses 100, the control server 200, and vehicle-mounted devices 300 are connected to each other via a network. A WAN (Wide Area Network) that is, for example, a world scale public communication network, such as the Internet, or other communication networks may be adopted as the network. The network may also include a telephone communication network, such as mobile phones, and a wireless communication network, such as Wi-Fi (registered trademark).

Each of the elements that constitute the system is described.

Figure 2:
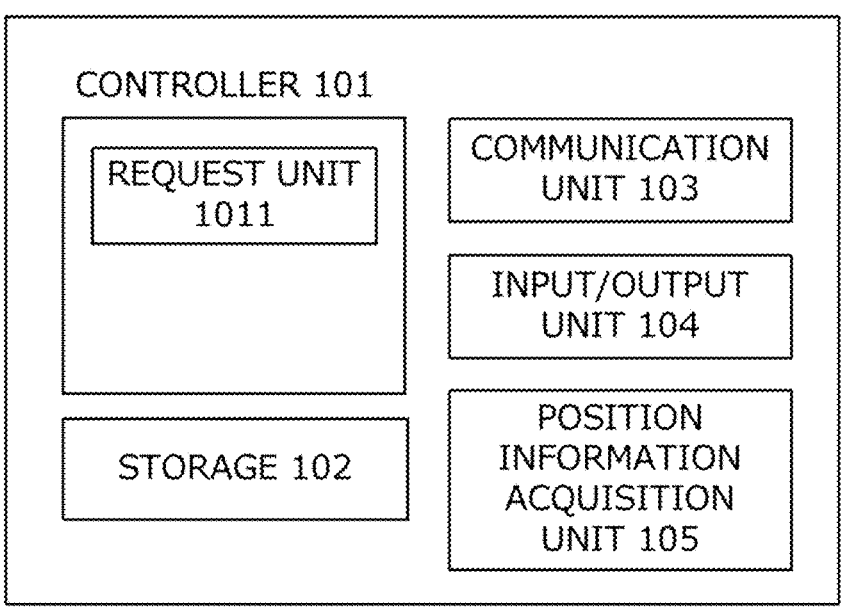
FIG. 2 is a diagram illustrating components of a user apparatus.

FIG. 2 is a diagram illustrating the system configuration of the user apparatus 100.

The user apparatus 100 is, for example, a small-sized computer, such as a smartphone, a mobile phone, a tablet computer, a personal digital assistant, a notebook computer, or a wearable computer (smart watch etc.). The user apparatus 100 is configured to include a controller 101, a storage 102, a communication unit 103, an input/output unit 104, and a position information acquisition unit 105.

The controller 101 is a computational device that administers control performed by the user apparatus 100. The controller 101 can be achieved by a computation processing device, such as a CPU (Central Processing Unit).

The controller 101 is configured to include a request unit 1011 as a function module. The function module may be achieved by the CPU executing a program stored in the storage 102 described later.

The request unit 1011 acquires, from the user of the apparatus, information required to request the vehicle to provide the service, and transmits the service request including this information to the control server 200.

The service request includes the type of the intended service, and service content. For example, in a case where the intended service is the passenger transport service, an intended boarding point, an intended boarding time, an intended alighting point and the like can be exemplified as the service content. In a case where the intended service is a mobile shop service, the type, identifier, quantity and the like of articles intended to be purchased can be exemplified as the service content. The service content varies depending on the type of the service.

The request unit 1011 acquires these pieces of information via the input/output unit 104 described later. The acquired information is transmitted as the service request to the control server 200. FIG. 3 illustrates an example of the service request generated by the request unit 1011. The request unit 1011 performs a process of confirming a reservation for the vehicle 10, by interaction with the control server 200.

The storage 102 is configured to include a main memory, and an auxiliary storage device. The main memory is a memory where a program to be executed by the controller 101, and data used by the control program are deployed. The auxiliary storage device is a device where a program to be executed by the controller 101, and data used by the control program are stored. The auxiliary storage device may store programs that are to be executed by the controller 101 and are packaged as applications. An operating system for executing the applications may be stored. The programs stored in the auxiliary storage device are loaded into the main memory, and are executed by the controller 101, thus performing processes described later.

The main memory may include a RAM (Random Access Memory), and a ROM (Read Only Memory). The auxiliary storage device may include an EPROM (Erasable Programmable ROM), and a hard disk drive (HDD). Furthermore, the auxiliary storage device may include a removable medium, i.e., a portable recording medium.

The communication unit 103 is a wireless communication interface for connecting the user apparatus 100 to the network. For example, the communication unit 103 provides access to the network, through a wireless LAN, or a mobile communication service, such as 3G or LTE.

The input/output unit 104 is a unit that accepts input operation performed by the user of the apparatus, and presents information. In this embodiment, the input/output unit 104 is made up of one touch panel display. That is, the input/output unit 104 is made up of a liquid crystal display and its control unit, and a touch panel and its control unit.

Next, the configuration of the control server 200 is described.

The control server 200 can be configured as a computer that includes a processor, such as a CPU and a GPU, a main memory, such as a RAM and a ROM, and an auxiliary storage device, such as an EPROM, a hard disk drive, or a removable medium. The auxiliary storage device stores the operating system (OS), various programs, various tables and the like. By executing the programs stored there, each function in conformity with a predetermined purpose as described later can be achieved. Note that part of or the entire function may be achieved by a hardware circuit, such as an ASIC or an FPGA. Note that the control server 200 may be made up of a single computer, or made up of a plurality of computers that cooperate with each other.

Figure 4:
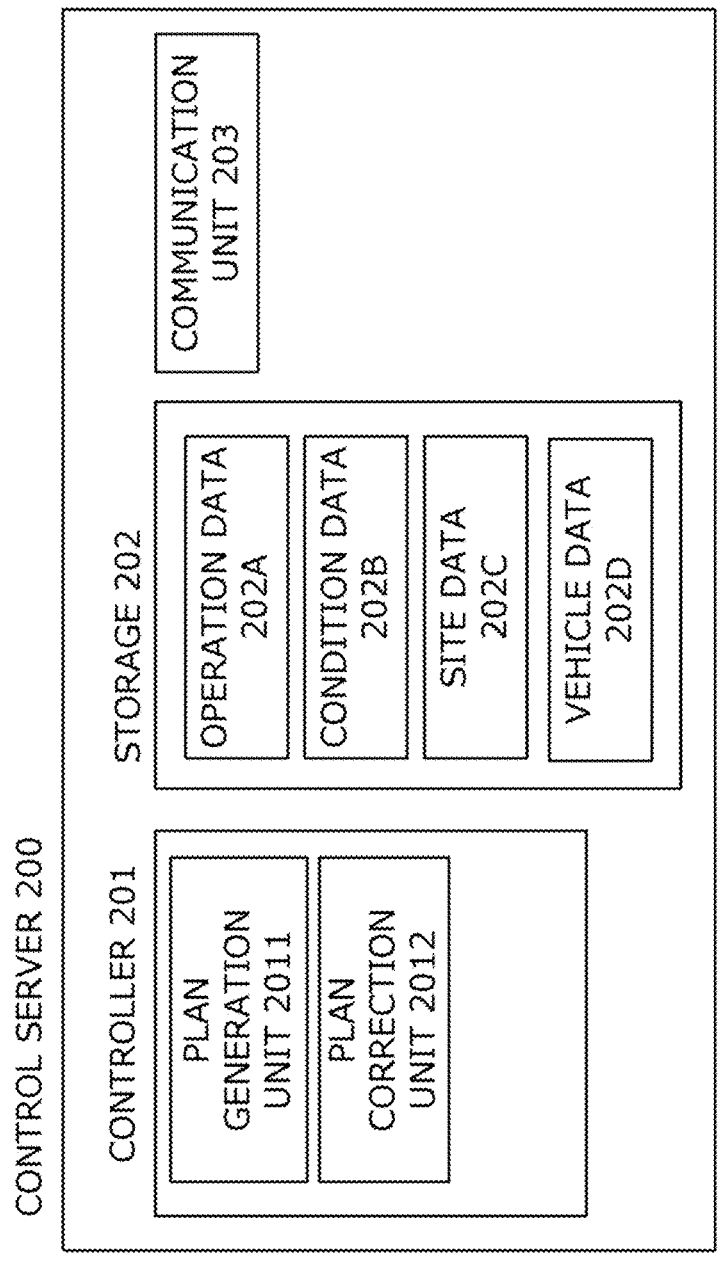
FIG. 4 is a diagram illustrating components of a control server.

FIG. 4 is a diagram illustrating the system configuration of the control server 200. The control server 200 is configured to include a controller 201, a storage 202, and a communication unit 203.

The controller 201 is a computational device that administers control performed by the control server 200. The controller 201 can be achieved by a computation processing device, such as a CPU.

The controller 201 is configured to include two types of function modules that are a plan generation unit 2011, and a plan correction unit 2012. Each function module may be achieved by the CPU executing a program stored in an auxiliary storage unit.

Firstly, the plan generation unit 2011 updates the data for managing the operation schedule of the vehicles 10, based on the service request received from the user apparatus 100. Secondly, the plan generation unit 2011 transmits the operation command to the vehicle 10, based on the operation schedule.

In this embodiment, operation data is exemplified as the data for managing the operation schedule of the vehicles 10. The operation data is a set of the operation schedules of the plurality of vehicles 10 (described later in description of the storage 202).

Specifically, when the service request is transmitted, the plan generation unit 2011 refers to the operation schedule for each vehicle, determines the vehicle 10 that is to provide the service, and updates the operation schedule of this vehicle.

After the operation schedule is determined, the plan generation unit 2011 generates the operation command (first command) for operating the vehicle 10 according to the operation schedule, and transmits it to the target vehicle 10.

Figures 5A, 5B, 5C:
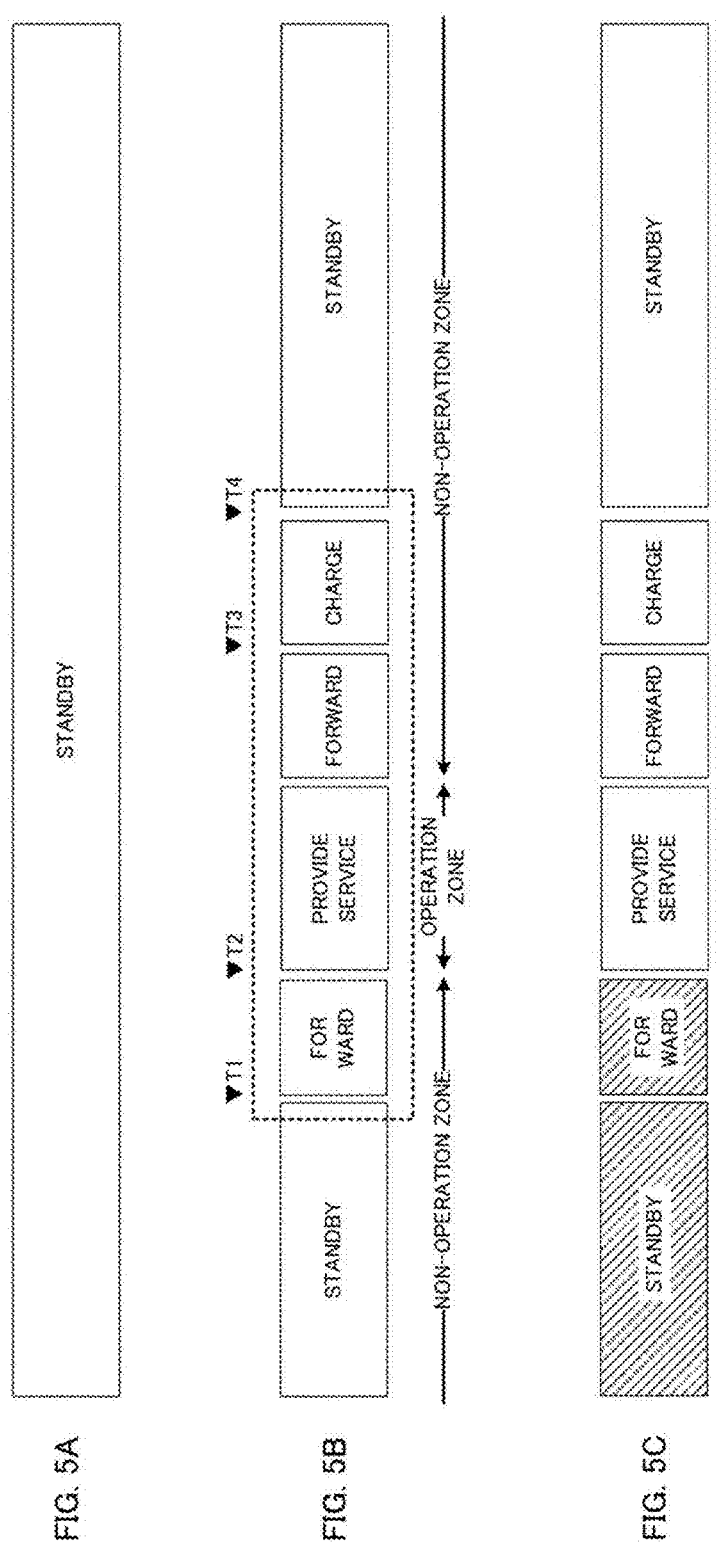
FIGS. 5A to 5C are diagrams for illustrating operation schedules of vehicles.

FIG. 5A is a diagram illustrating a state where no operation schedule is set with respect to the vehicle 10. In this case, the vehicle 10 is in a standby state at a predetermined vehicle site.

FIG. 5B illustrates an example of an operation schedule updated based on a service request for requesting the transport service. In this example, the vehicle 10 departs from the vehicle site at time T1, and travels toward a designated point. At time T2, a user is picked up, and the transport service is provided. After service providing is finished, the vehicle 10 returns to the vehicle site, and charging is started at time T3. When the charging is finished at time T4, the state becomes the standby state again, thus being in a state capable of responding to another request. In the diagram, the operation zone indicates a zone where operation is performed, and the non-operation zones indicate zones where no operation is performed. In the non-operation zone, the vehicle 10 executes each task (preparation task) of forwarding, charging, or cleaning, which is for service providing.

Note that it may be determined, based on a predetermined rule, which preparation task is executed in a case of execution of a certain type of service, and the execution order of the preparation tasks. For example, each of the preparation tasks may be assigned a priority, and the execution order of the preparation tasks may be determined based on the priorities.

The vehicle site from which the vehicle 10 departs, and the vehicle site to which the vehicle 10 returns may be different from each other. The vehicle site to which the vehicle 10 returns may be dynamically determined based on, for example, the distance from a point where service providing is finished, or the situation of a parking space (parking availability information) at the vehicle site.

Note that the plan generation unit 2011 may reflect achievement in the operation schedule, based on data (hereinafter, vehicle data) received from the vehicle 10 (vehicle-mounted device 300). For example, hatching parts in FIG. 5C represent tasks having already been completed. With respect to a specific vehicle, it can be determined which task has been completed in accordance with the vehicle data received from the vehicle 10 (vehicle-mounted device 300).

On the other hand, since the operation schedule generated by the plan generation unit 2011 is based on the result of prediction of the traffic condition, possible change in the traffic condition, environment and the like could result in a delay. If the delay is accumulated, the service specified in the operation schedule is possibly incapable of being provided as intended (for example, nonarrival at a designated place by time intended by the user).

The plan correction unit 2012 determines occurrence of a delay of the operation of a specific vehicle 10, based on the existing operation schedule, and on data received from the vehicle 10, and corrects the operation schedule.

Figures 6A, 6B, 6C, 6D:
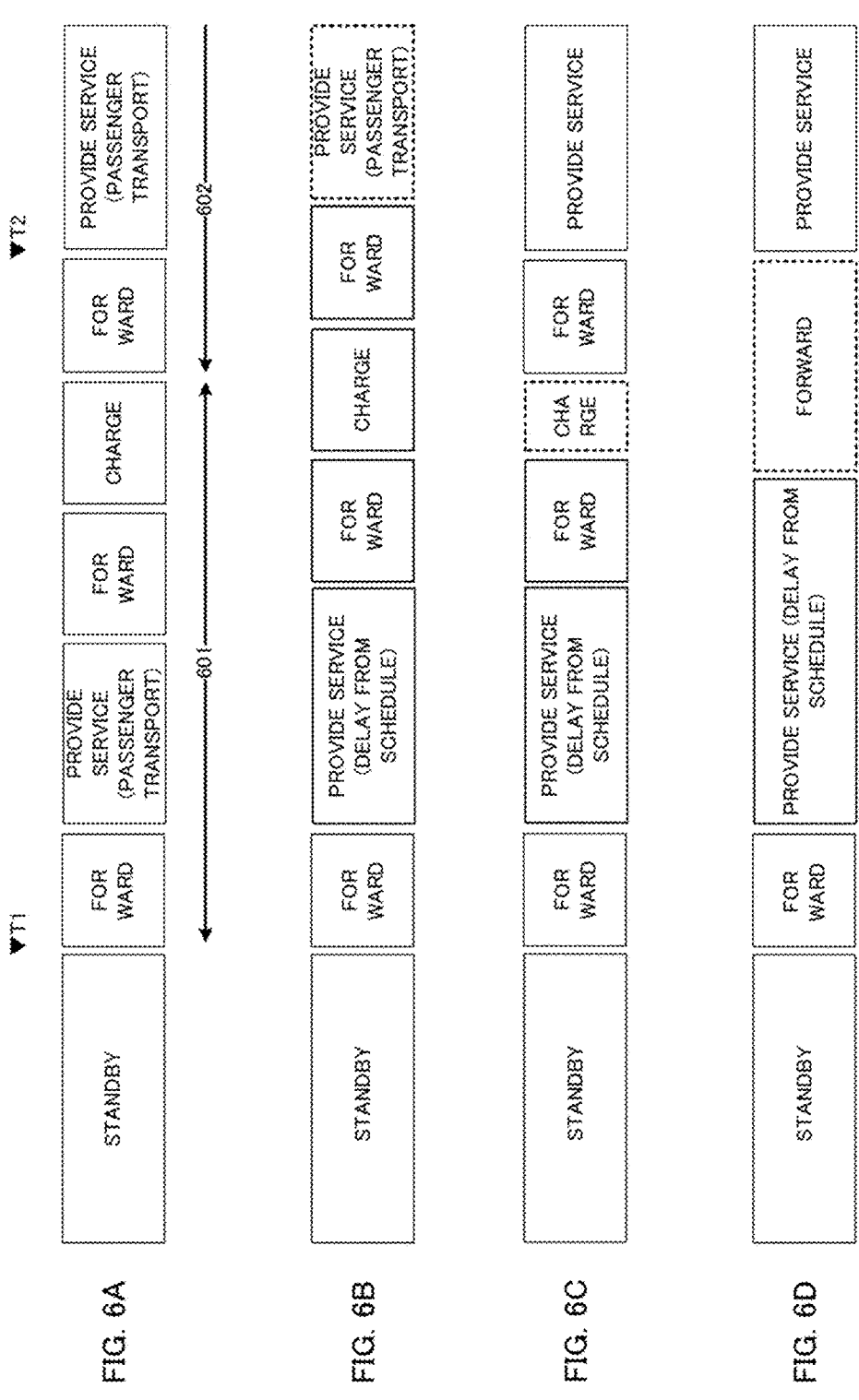
FIGS. 6A to 6D are diagrams for illustrating operation schedules of vehicles.

FIG. 6A illustrates an example of the operation schedule generated for a certain vehicle 10. In this example, two operations that are the operation indicated by a symbol 601, and the operation indicated by a symbol 602 are sequentially performed.

It is herein assumed that service providing is delayed from the schedule, as illustrated in FIG. 6B. For example, if the service is a passenger transport service, nonarrival at the destination by a scheduled time is sometimes caused by traffic congestion or the like. In this case, if forwarding and charging of the vehicle are performed as scheduled, arrival at the designated place by the next time T2 cannot be achieved. Accordingly, in this embodiment, in case the operation schedule of a predetermined vehicle is delayed, the plan correction unit 2012 tries to restore the delay by omitting or reducing the preparation tasks included in the non-operation zone.

For example, if the battery for travel of the vehicle 10 has been sufficiently charged, and even possible reduction of the charging time allows the next service to be provided, the delay can be restored by reducing the time required for the task of "charging", as illustrated in FIG. 6C.

Alternatively, if the next service can be provided even without charging itself, the delay can be restored by omitting the task of "charging" as illustrated in FIG. 6D.

The plan correction unit 2012 acquires data (hereinafter, condition data) defining preparation tasks that can be omitted or reduced, and conditions for the omission or reduction, and corrects the operation schedule based on the data. An operation command (second command) for operating the vehicle 10 is generated according to the operation schedule, and is transmitted to the target vehicle 10.

The storage 202 is configured to include a main memory, and an auxiliary storage device. The main memory is a memory where a program to be executed by the controller 201, and data used by the control program are deployed. The auxiliary storage device is a device where a program to be executed by the controller 201, and data used by the control program are stored.

The storage 202 stores operation data 202A, condition data 202B, site data 202C, and vehicle data 202D.

The operation data 202A is data for recording the operation schedules of the plurality of vehicles 10.

For example, the operation data 202A may be data representing the operation schedule of the vehicle 10 in a time-series manner as illustrated in FIGS. 5A to 5C and FIGS. 6A to 6D.

As described above, the condition data 202B is the data defining the tasks that can be omitted or reduced, and conditions for the omission or reduction.

FIG. 7 illustrates an example of the condition data. The condition data is data that associates identifiers of vehicle sites, types of preparation tasks, originally required times, preparation task omission conditions, and preparation task reduction conditions and the like with each other. For example, the depicted example illustrates that if the difference between the current amount of charge of the vehicle 10 and a target amount of charge is 10% or less, the preparation task of charging, which originally requires 30 minutes, can be omitted. The depicted example also illustrates that if the difference between the current amount of charge of the vehicle 10 and a target amount of charge is 30% or less, the preparation task of charging, which originally requires 30 minutes, can be reduced to 15 minutes.

Note that the amount of charge is a fixed value in this example. However, the threshold of the amount of charge may be dynamically determined based on the content and the like of a service scheduled next.

The site data 202C includes data about a plurality of vehicle sites.

FIG. 8 illustrates an example of the site data 202C. The site data is data that associates the identifiers of the vehicle sites, position information on the vehicle sites, parking availability information (availability information on the parking space), and types of executable preparation tasks with each other. With reference to the site data 202C, it can be determined which vehicle site the vehicle 10 should be forwarded to in order to continue service providing (or maintaining the service quality).

The vehicle data 202D is a set of vehicle data items received from the vehicles 10 (vehicle-mounted devices 300). As described above, the vehicle data is data indicating the current situation of the vehicle 10.

FIG. 9 illustrates an example of the vehicle data. The vehicle data includes an identifier of the vehicle 10, date and time information, position information on the vehicle 10, and the processing state of a task (for example, which task among the plurality of given tasks has been finished, or which is currently in execution). The processing state of the task may include a delay time period from the planned schedule.

The communication unit 203 is a communication interface for connecting the control server 200 to the network. The communication unit 203 is configured to include, for example, a network interface board, and a wireless communication circuit for wireless communication.

Here, the flow of processes executed by the aforementioned plan generation unit 2011 and plan correction unit 2012 is described in more detail.

Figure 10:
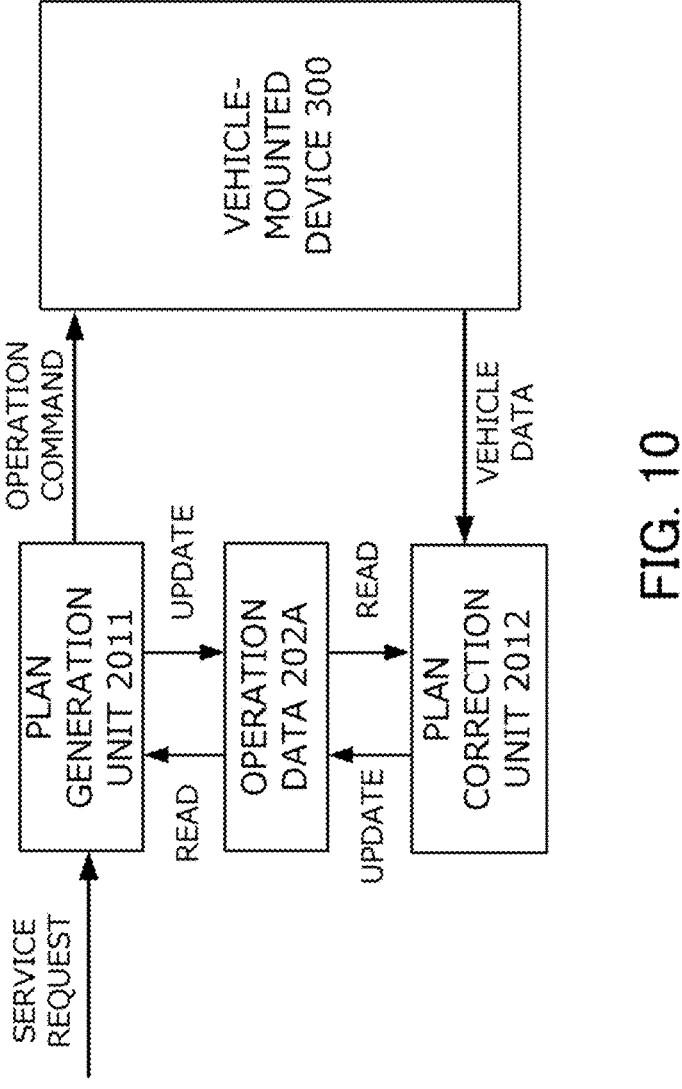
FIG. 10 is a diagram illustrating a flow of processes of issuing a command for operation to a vehicle.

FIG. 10 is a diagram illustrating the flow of processes determining the operation schedule of the vehicle 10, based on the service request, and commanding the vehicle 10 to operate.

The plan generation unit 2011 determines a vehicle 10 that provides the service, based on the service request received from the user apparatus 100. The vehicle 10 that provides the service can be determined based on the operation data 202A. For example, if the requested service is the transport service, the plan generation unit 2011 determines the vehicle 10 that can be assigned a series of tasks "traveling to a designated point from the vehicle site, providing the transport service, returning to the vehicle site, and being charged".

If there is a vehicle 10 that can be assigned the series of tasks, the operation schedule illustrated in FIG. 5A is updated as in FIG. 5B. When the operation schedule is determined, the plan generation unit 2011 generates a corresponding operation command, and transmits the operation command to the vehicle-mounted device 300 mounted on the vehicle 10 that is a target.

FIG. 11 illustrates an example of the operation command. As illustrated in the diagram, the operation command includes a plurality of tasks to be executed by the vehicle 10. Each task may be associated with a scheduled time, and a deadline time.

Returning to FIG. 10, the description is continued.

The plan correction unit 2012 periodically receives the vehicle data from each vehicle 10 (vehicle-mounted device 300), and updates the operation schedule based on it.

For example, it is assumed that in the case in FIG. 6B, the service providing (i.e., passenger transport) is delayed by 10 minutes from the schedule. The delay from the schedule can be determined based on the task processing state included in the vehicle data, for example. In this case, the timing after which the next service can be provided is delayed by 10 minutes. Consequently, as shown in FIG. 5C or 5D, the plan correction unit 2012 regenerates an operation schedule where the preparation tasks in the non-operation zone are omitted or reduced, based on the condition data 202B.

If the conditions are not satisfied and the preparation tasks cannot be omitted or reduced, or if the subsequent schedule is delayed by this, the plan correction unit 2012 may transmit a notification about this to a system administrator or the user apparatus 100.

Next, the configuration of the vehicle-mounted device 300 is described.

The vehicle-mounted device 300 is a computer mounted on the vehicle 10. The vehicle-mounted device 300 exchanges information about the operation by communicating with the control server 200.

The vehicle-mounted device 300 may also serve as a device that provides information for the crew or passengers of the vehicle 10. The vehicle-mounted device 300 may be an electronic control unit (ECU) included in a vehicle platform. The vehicle-mounted device 300 may be a data communication module (DCM) having a communication function.

The vehicle-mounted device 300 has a function of wirelessly communicating with an external network. The vehicle-mounted device 300 may have a function of downloading traffic information, road map data and the like by communicating with the external network.

The vehicle-mounted device 300 can be configured as a computer that includes a processor, such as a CPU and a GPU, a main memory, such as a RAM and a ROM, and an auxiliary storage device, such as an EPROM, a hard disk drive, or a removable medium. The auxiliary storage device stores the operating system (OS), various programs, various tables and the like. By executing the programs stored there, each function in conformity with a predetermined purpose as described later can be achieved. Note that part of or the entire function may be achieved by a hardware circuit, such as an ASIC or an FPGA.

Figure 12:
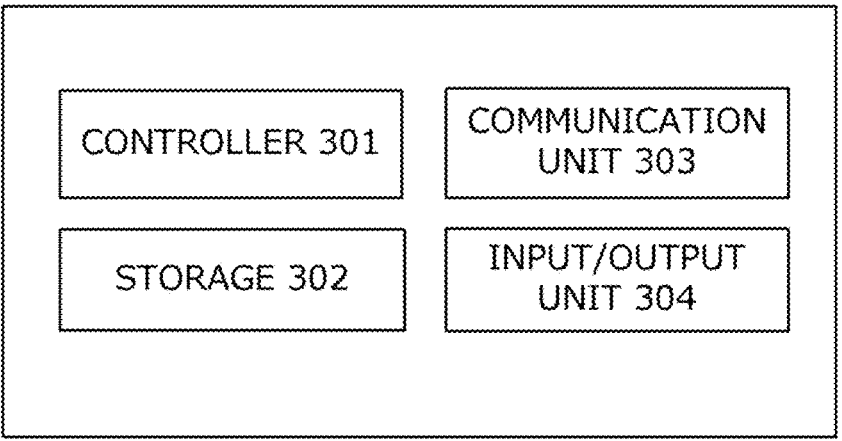
FIG. 12 is a diagram illustrating components of a vehicle-mounted device.

FIG. 12 is a diagram illustrating the components of the vehicle-mounted device 300 in detail.

The vehicle-mounted device 300 is configured to include a controller 301, a storage 302, a communication unit 303, and an input/output unit 304.

The controller 301 is a computational unit that achieves various functions of the vehicle-mounted device 300 by executing predetermined programs. The controller 301 may be achieved by a CPU or the like, for example. The controller 301 may achieve its function by the CPU executing stored programs.

The controller 301 acquires or generates data (vehicle data) about the operation of the vehicle 10 at predetermined timing, and transmits it to the control server 200. The vehicle data includes, for example, position information, and the task processing state. The controller 301 has a function of acquiring the position information via a GPS module or the like.

The storage 302 is a unit that stores information, and is made up of a storage medium, such as a RAM, a magnetic disk, or a flash memory. The storage 302 stores various programs to be executed by the controller 301, and data and the like used by the programs.

The communication unit 303 includes an antenna and a communication module for wireless communication. The antenna is an antenna element that performs input and output of wireless signals. In this embodiment, the antenna conforms to mobile communication (e.g., mobile communication of 3G, LTE, 5G or the like). Note that the antenna may be configured to include a plurality of physical antennas. For example, in a case of mobile communication using radio waves in a high-frequency band, such as microwaves, or millimeter waves, the plurality of antennas may be arranged in a distributed manner in order to facilitate communication stabilization. The communication module is a module for performing mobile communication.

The input/output unit 304 is a unit that accepts input operation, and presents information. In this embodiment, the input/output unit 304 is made up of one touch panel display. That is, the input/output unit 304 is made up of a liquid crystal display and its control unit, and a touch panel and its control unit.

Note that the configurations illustrated in FIGS. 2, 4, and 12 are examples. The entire or part of illustrated function may be achieved using a circuit designed in a dedicated manner. The programs may be stored or executed by a combination of the main memory and the auxiliary storage device that is other than what is illustrated.

Next, the processes executed by each apparatus are described.

Figure 13:
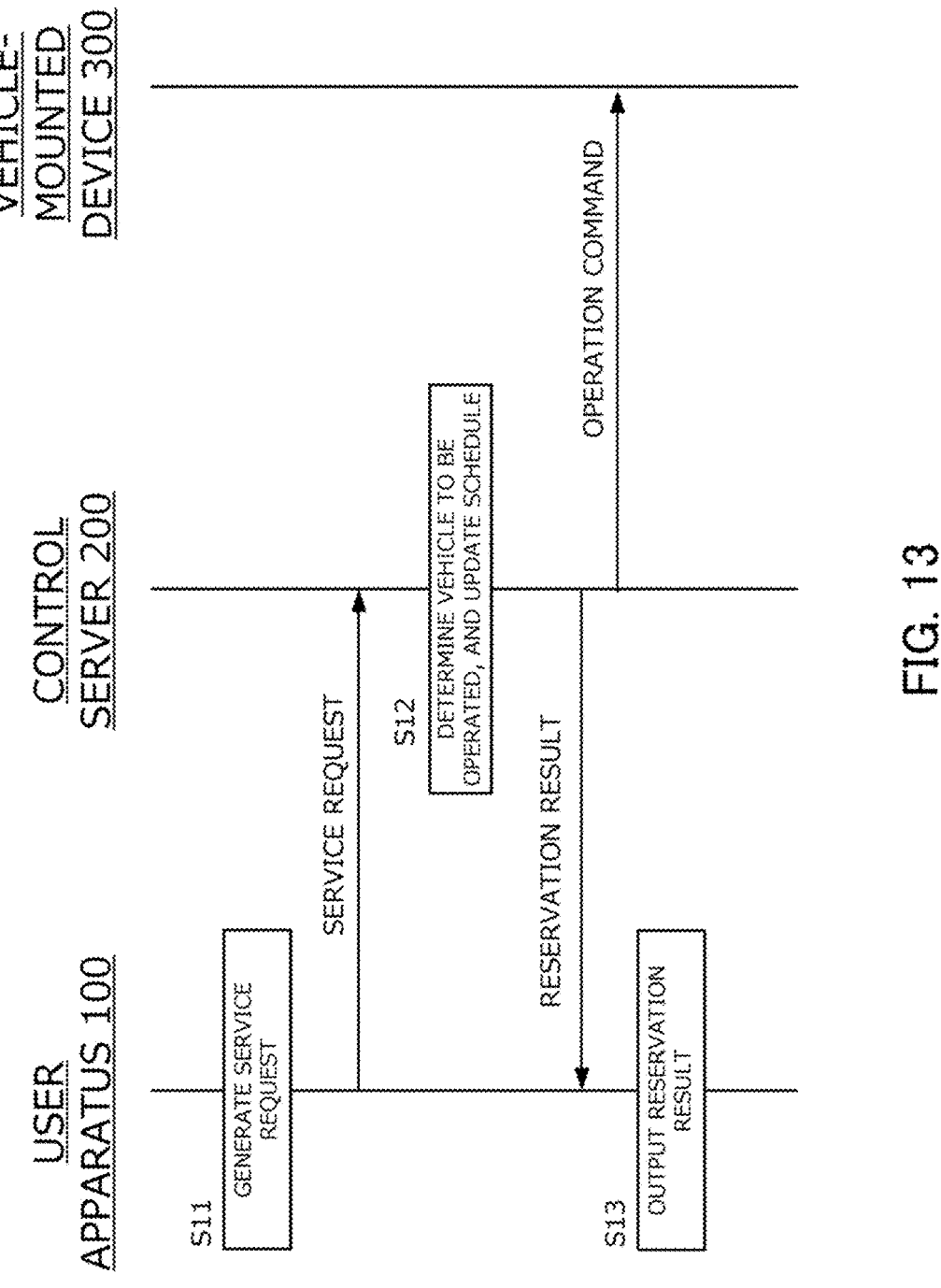
FIG. 13 is a sequence diagram of processes of instructing the vehicle to operate, based on a service request.

FIG. 13 is a sequence diagram of processes by the control server 200 accepting the service request. The illustrated processes are started based on operation by the user.

First, in step S11, the user apparatus 100 (request unit 1011) generates the service request. In this step, the user is allowed to input the service to be requested, and data about its content, through a predetermined interface.

The service request includes the type of the intended service, and service content. For example, in a case where the intended service is the passenger transport service, an intended boarding point, an intended boarding time, an intended alighting point and the like can be exemplified as the service content. In a case where the intended service is a mobile shop service, the type, identifier, quantity and the like of articles intended to be purchased can be exemplified as the service content.

The request unit 1011 transmits the generated service request to the control server 200 (plan generation unit 2011).

In step S12, the control server 200 (plan generation unit 2011) determines the vehicle 10 that provides the service, based on the operation data 202A, and generates its operation schedule. The vehicle 10 that provides the service can be determined based on a time period required to provide the requested service, and on the attribute and the like of the vehicle 10. When the operation schedule is determined, the plan generation unit 2011 generates a corresponding operation command, and transmits the operation command to the vehicle-mounted device 300 mounted on the vehicle 10 that is a target. The plan generation unit 2011 transmits a reservation result to the user apparatus 100, and the request unit 1011 outputs it (step S13). Accordingly, the user can confirm that the reservation for the vehicle 10 is established.

The vehicle-mounted device 300 transmits the operation command to a device that controls autonomous travel, or provides it for the crew. Accordingly, the operation of the vehicle 10 is started.

Figure 14:
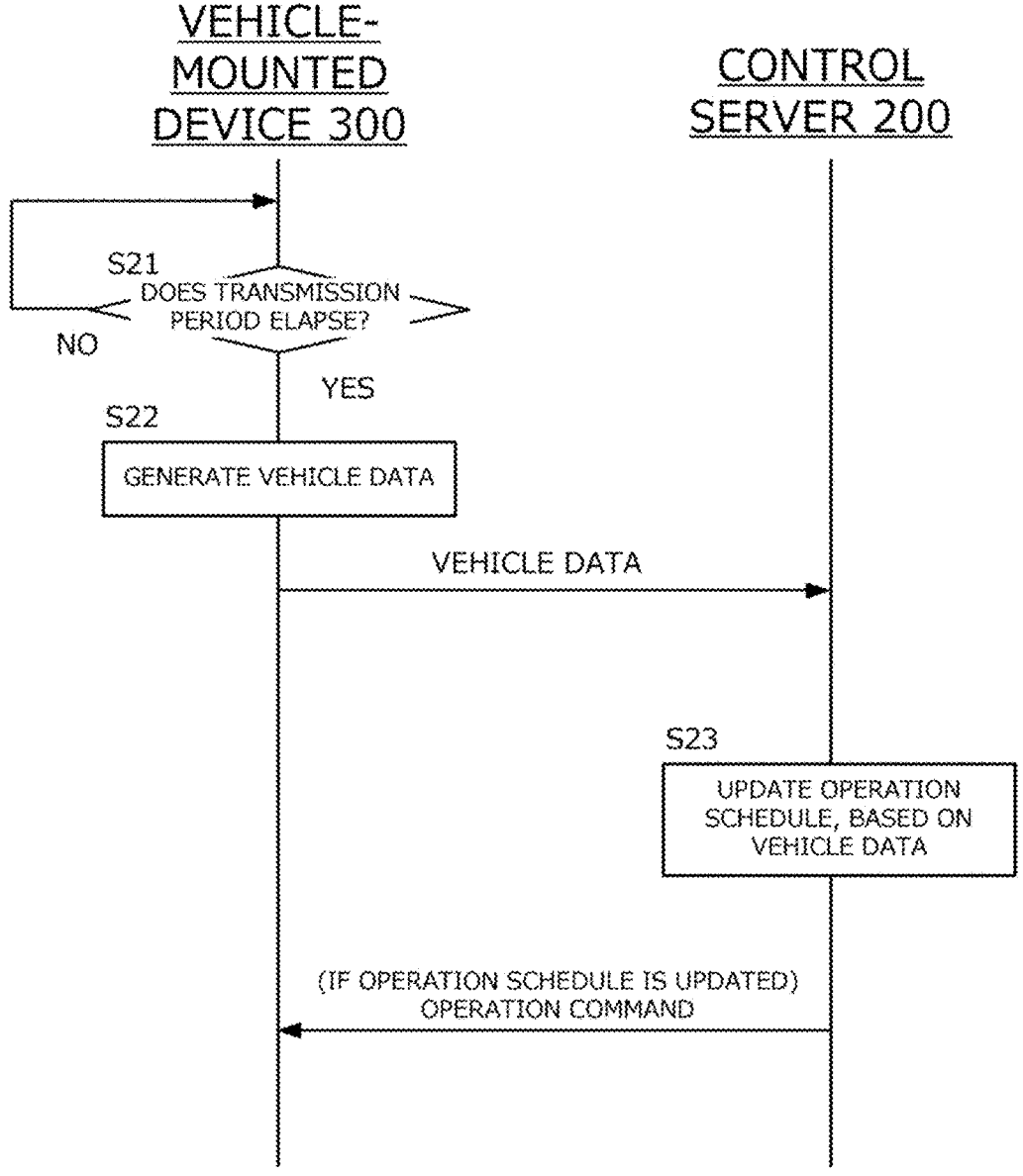
FIG. 14 is a sequence diagram of processes of correcting an operation schedule, based on vehicle data.

FIG. 14 is a sequence diagram of a process by the vehicle-mounted device 300 and the control server 200 transmitting and receiving the vehicle data. The illustrated process is repeatedly executed by the controller 301 at a predetermined period during operation of the vehicle 10.

First, in step S21, the vehicle-mounted device 300 determines whether a predetermined transmission period elapses or not. If the predetermined period (e.g., every one minute) elapses, the processing transitions to step S12. If the predetermined period does not elapse, a predetermined time is waited for, and the process is repeated.

In step S22, the vehicle-mounted device 300 generates the vehicle data. The generated vehicle data is transmitted to the control server 200 in step S13.

In step S23, the control server 200 (plan correction unit 2012) receives the vehicle data transmitted from the vehicle-mounted device 300, and updates the operation schedule (operation data 202A) of the vehicle 10, based on the vehicle data.

Figure 15:
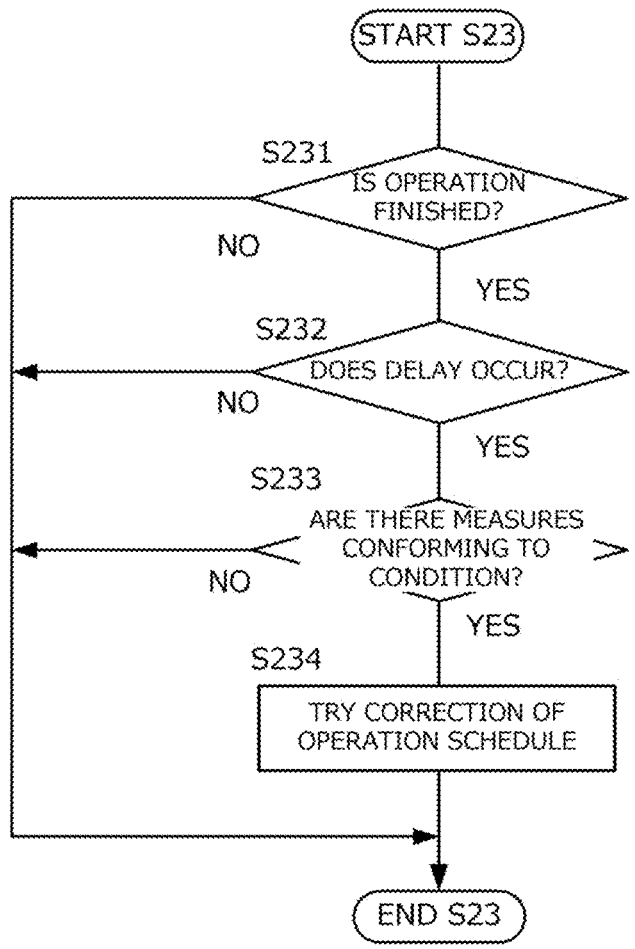
FIG. 15 is a flowchart of an operation schedule correcting process.

FIG. 15 is a flowchart that illustrates the process executed in step S23 in more detail.

First, in step S231, it is determined whether the target vehicle 10 enters the non-operation zone from the operation zone or not. If the target vehicle 10 finishes the operation, affirmative determination is made in this step. The operation state of the vehicle 10 can be determined based on the task processing state included in the vehicle data.

Next, in step S232, it is determined whether the operation schedule is delayed or not. Likewise, presence or absence of occurrence of the delay can be determined based on the task processing state included in the vehicle data. If the delay occurs, the processing transitions to step S233.

In step S233, based on the condition data 202B, it is determined whether the delay can be restored or not by at least partially omitting the preparation tasks. In this step, from the condition data 202B, a record is extracted, based on the vehicle site and the types of the preparation tasks, and it is determined whether there is anything satisfying any of the omission conditions and the reduction conditions.

If the delay can be restored by omitting or reducing the preparation task, the processing proceeds to step S234, an operation schedule where the preparation task is omitted or reduced is regenerated.

If the operation schedule is corrected, an operation command corresponding to the corrected operation schedule is generated, and is transmitted to the vehicle 10 (vehicle-mounted device 300). The vehicle-mounted device 300 overwrites the new operation command on the task in execution.

If the operation schedule cannot be corrected, the plan correction unit 2012 may notify a predetermined apparatus of this.

Note that in this example, it is assumed that the vehicle-mounted device 300 transmits the vehicle data at a predetermined period. Alternatively, transmission of the vehicle data may be performed only at timing of occurrence of a predetermined event. For example, timing when the vehicle 10 starts a new task, timing when the task in execution is completed by the vehicle 10, or timing when the vehicle 10 reaches a predetermined spot can be exemplified as such timing.

As described above, in the vehicle system according to the first embodiment, the control server 200 monitors the operation of the plurality of vehicles 10, and omits or reduces one or more preparation tasks to be executed in the non-operation zone, in case the operation schedule is delayed. According to such a configuration, even in case the operation schedule of the vehicle 10 is delayed, the delay can be restored with the effect on the demander being minimized.

Second Embodiment

In the first embodiment, the information about the corrected operation schedule is transmitted only to the vehicle 10 (vehicle-mounted device 300). On the other hand, a second embodiment is an embodiment where the information about the corrected operation schedule is transmitted also to an information processing apparatus corresponding to the vehicle site.

For example, it is preferable that in a case of cleaning the interior of a vehicle, an instruction about the cleaning level, cleaning start time, cleaning finish time and the like is issued to a cleaner, and information about a cleaning completion state should be acquired from the cleaner. In a case of charging a vehicle, it is preferable that an apparatus for managing charging, and an administrator of a charging station should be notified of the amount of charge, charging start time, charging finish time and the like.

In the second embodiment, if the control server 200 generates or corrects the operation schedule of the vehicle, information about the preparation tasks included in the operation schedule is transmitted to an apparatus (hereinafter, a site server) associated with the vehicle site.

The control server 200 determines the progress states of the preparation tasks and the like, based on information acquired from the site server.

Figure 16:
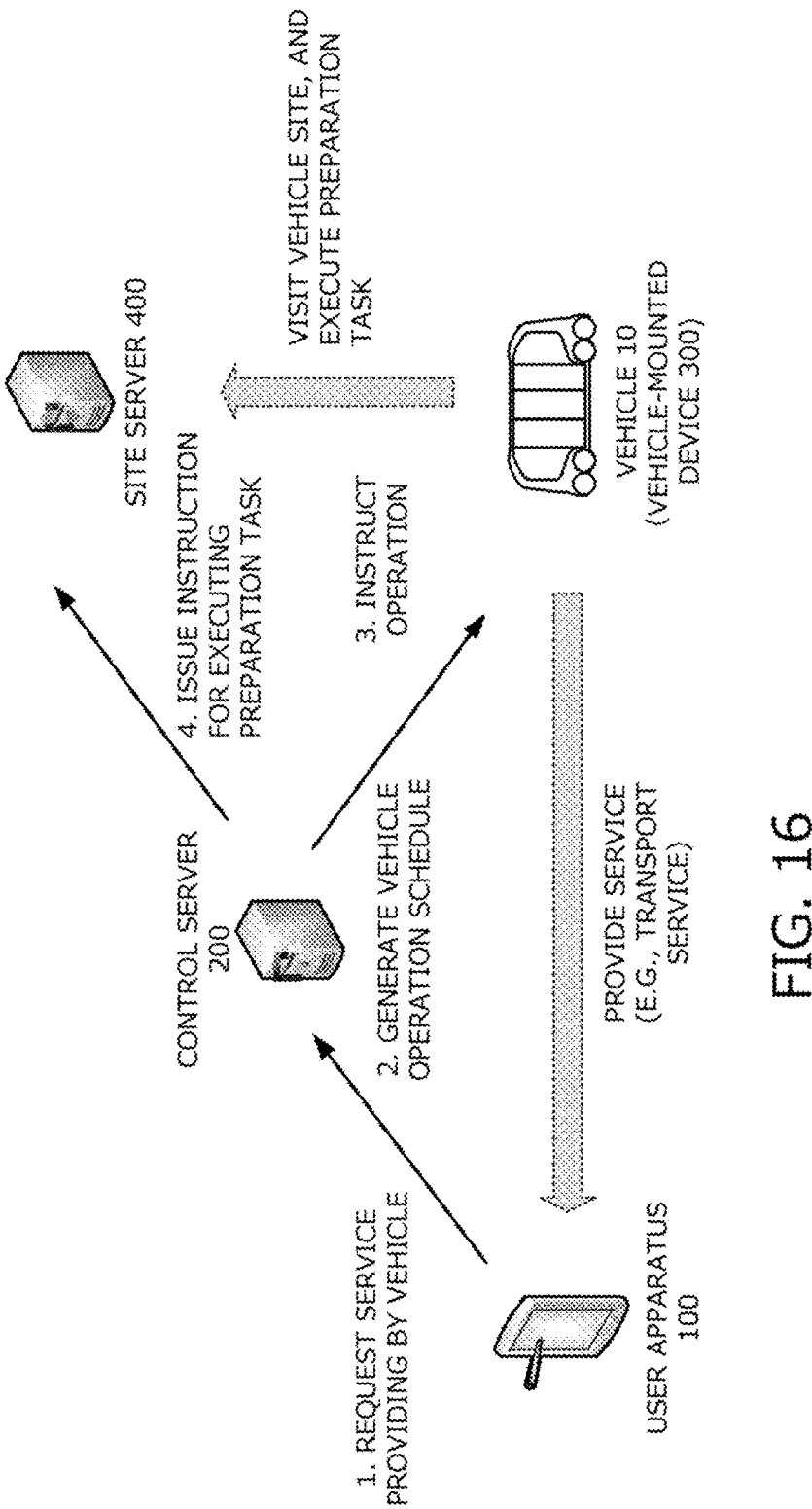
FIG. 16 is a schematic diagram of a vehicle system according to a second embodiment.

FIG. 16 is a schematic diagram of a vehicle system according to a second embodiment.

As illustrated in the diagram, in the second embodiment, the control server 200 is configured to be capable of communicating with site servers 400. The site servers 400 are apparatuses installed at the respective vehicle sites, and for example, an apparatus that manages charging of the vehicle 10, an apparatus that manages cleaning of the vehicle 10, an apparatus that manages parking of the vehicle 10 and the like. Each site server 400 may be a fixed apparatus, or a mobile terminal carried by the cleaner or the like.

Figure 17:
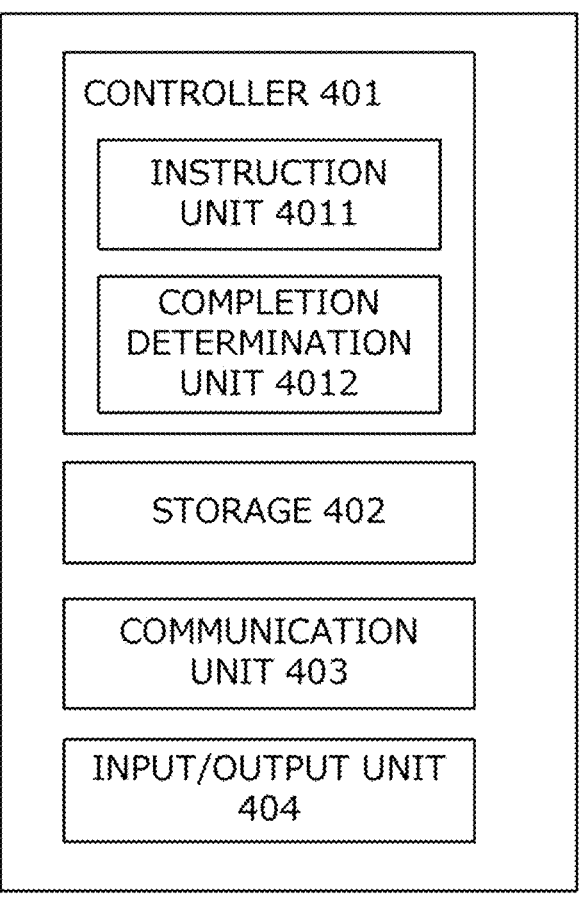
FIG. 17 is a diagram illustrating components of the site server.

FIG. 17 is a diagram illustrating the components of the site server 400 in detail.

The site server 400 is configured to include a controller 401, a storage 402, a communication unit 403, and an input/output unit 404.

The controller 401 is a computational unit that achieves various functions of the site server 400 by executing predetermined programs. The controller 401 may be achieved by a CPU or the like, for example. The controller 401 may achieve its function by the CPU executing stored programs.

The controller 401 is configured to include two types of function modules that are an instruction unit 4011, and a completion determination unit 4012. Each function module may be achieved by the CPU executing a program stored in an auxiliary storage unit.

The instruction unit 4011 receives data (hereinafter, instruction data) about an instruction for executing the preparation task, from the control server 200, and instructs an entity of executing the preparation task to execute the preparation task, based on the instruction data. For example, in the case where the preparation task is cleaning, the instruction unit 4011 instructs the cleaner to execute vehicle interior cleaning. In the case where the preparation task is charging, the instruction unit 4011 instructs the apparatus that manages charging of the vehicle 10 and the like to execute charging. The instruction includes the types of preparation tasks (e.g., cleaning, charging, etc.), the execution order of preparation tasks, situations to be achieved (e.g., the cleaning level, the amount of charge, etc.), the start time, the finish time and the like.

The completion determination unit 4012 acquires information about the progress state of the preparation task from the entity of executing the preparation task, and determines whether the completion condition of the preparation task is satisfied or not based on the information. For example, the completion determination unit 4012 determines that the vehicle 10 has reached a predetermined cleaning level, based on information input by the cleaner. The completion determination unit 4012 determines that the amount of charge of the vehicle 10 has reached a predetermined value, based on information acquired from the apparatus that manages charging of the vehicle 10. To achieve this, the completion determination unit 4012 may periodically acquire the information about the progress state of the preparation task.

If the progress state of the preparation task satisfies completion condition, the completion determination unit

4012 instructs the entity of executing the preparation task to finish the execution of the preparation task. If a scheduled time has elapsed even with the completion condition being not satisfied, the completion determination unit 4012 may finish the execution of the preparation task.

The storage 402 is a unit that stores information, and is made up of a storage medium, such as a RAM, a magnetic disk, or a flash memory. The storage 402 stores various programs to be executed by the controller 401, and data and the like used by the programs.

The communication unit 403 includes an antenna and a communication module for wireless communication. The antenna is an antenna element that performs input and output of wireless signals. The communication module is a module for performing mobile communication.

The input/output unit 404 is a unit that accepts input operation, and presents information. In this embodiment, the input/output unit 404 is made up of one touch panel display. That is, the input/output unit 404 is made up of a liquid crystal display and its control unit, and a touch panel and its control unit.

In the second embodiment, at the timing of transmitting the operation command to the vehicle 10 (vehicle-mounted device 300), the control server 200 transmits data (instruction data) of issuing an instruction for executing the preparation tasks, to the site server 400 associated with the corresponding vehicle site.

The instruction data includes data about the types of the preparation tasks, the execution order of the preparation tasks, the start time, the finish time, the situations to be achieved and the like.

In the second embodiment, the control server 200 transmits an operation command to the vehicle 10 (vehicle-mounted device 300), and transmits the instruction data to the site server 400 at the same time. If the operation schedule is corrected, the control server 200 transmits a new operation command, as a second command, to the vehicle 10 (vehicle-mounted device 300), and transmits a new instruction data to the site server 400.

Figure 18:
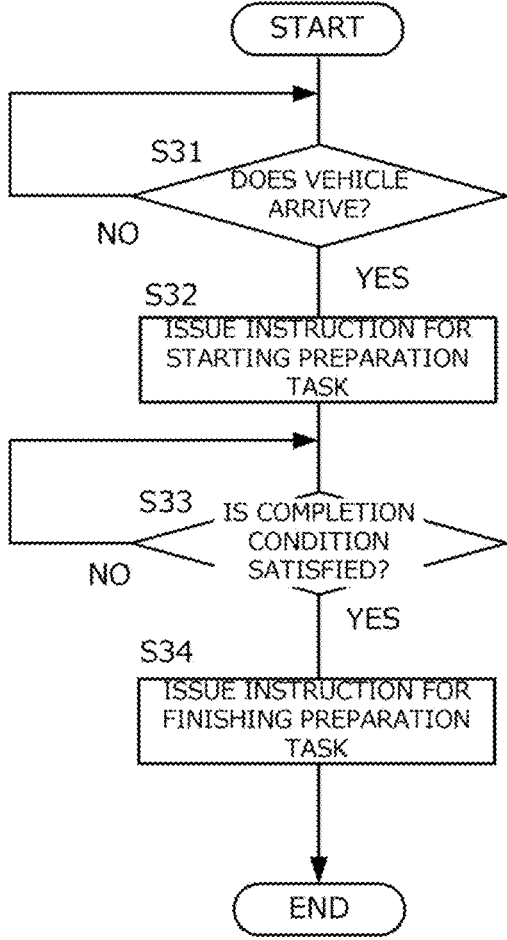
FIG. 18 is a flowchart of processes executed by the site server.

FIG. 18 is a flowchart of processes executed by the site server 400 having received the instruction data. The illustrated processes are started at timing when the site server 400 receives the instruction data.

The site server 400 (instruction unit 4011) having received the instruction data waits for arrival of the vehicle 10 designated by the instruction data (step S31). If the vehicle 10 arrives, the processing transitions to step S32, and the instruction unit 4011 instructs the entity of executing the preparation task to start the preparation task, based on the received instruction data.

In step S33, the completion determination unit 4012 determines whether the completion condition of the preparation task is satisfied or not. In this step, if the progress state of the preparation task reaches a predetermined situation, affirmative determination is made. The progress state of the preparation task can be determined based on data and the like acquired from the entity of executing the preparation task (e.g., the cleaner or a charging apparatus). If the completion condition of the preparation task is satisfied, the processing transitions to step S34, and the completion determination unit 4012 issues an instruction for finishing the preparation task.

If the operation schedule of the vehicle 10 is corrected, that is, the content or the time period of the preparation task is changed, the control server 200 regenerates instruction data, based on the correction, and transmits the correction to the site server 400. Accordingly, the content of the preparation task can be appropriately changed in accordance with the situations.

Modification Example

The embodiments described above are only examples. The present disclosure can be appropriately changed and implemented in a scope without departing from the gist.

For example, the processes and units described in this disclosure can be freely combined and implemented unless any technical contradiction occurs.

The description of the embodiment includes the example of on-demand operation of the vehicle 10 in response to the request by a demander. Alternatively, the operation schedule and the operation path of the vehicle 10 may be preliminarily defined.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing apparatus comprising:

a controller programmed to:

generate a first command to a first vehicle that is an autonomous driving vehicle, based on a predetermined operation plan that includes an operation zone for providing a predetermined service including any one of a passenger transport service, a package transport service, a package storage service and a mobile shop service, and a non-operation zone for executing one or more preparation tasks including at least one of interior cleaning of the first vehicle, standby of the first vehicle at a vehicle site and charging of the first vehicle, the non-operation zone being scheduled to follow the operation zone in the predetermined operation plan;

transmit the first command to the first vehicle to cause the first vehicle to travel autonomously to provide the predetermined service based on the predetermined operation plan of the first command, wherein the first vehicle is controlled according to the first command;

receive, at a predetermined time period, vehicle data transmitted from the first vehicle, the vehicle data including at least a processing state of tasks of the predetermined service and the one or more preparation tasks included in the predetermined operation plan;

determine whether the first vehicle has entered the non-operation zone from the operation zone based on the processing state of tasks included in the vehicle data;

in response to a determined entry of the first vehicle in the non-operation zone from the operation zone, determine whether the predetermined operation plan is delayed due to a delay having occurred in the operation zone with respect to the first vehicle entering the non-operation zone from the operation zone, based on the processing state of tasks;

correct an execution plan of the one or more preparation tasks included in the predetermined operation plan by omitting execution of the one or more preparation tasks or by reducing an execution time period of the one or more preparation tasks from what is originally planned, based on a predetermined condition so as to reduce a time period during which the first vehicle stays in the non-operation zone when the predetermined operation plan is delayed due to the delay having occurred in the operation zone;

generate a second command based on a corrected operation plan including the corrected execution plan; and transmit the second command to the first vehicle to cause the first vehicle to travel autonomously to execute the corrected execution plan based on the corrected operation plan of the second command, wherein the first vehicle is controlled according to the second command.

2. The information processing apparatus according to claim 1, wherein the predetermined condition includes a condition for omitting the execution of the one or more preparation tasks.

3. The information processing apparatus according to claim 2, wherein the preparation tasks include vehicle interior cleaning of the first vehicle, and the predetermined condition specifies that the vehicle interior cleaning should be omitted when a start time of the vehicle interior cleaning is delayed from the predetermined operation plan.

4. The information processing apparatus according to claim 2, wherein the preparation tasks include standby of the first vehicle at the vehicle site, and the predetermined condition specifies that the standby should be omitted when a start time of the standby is delayed from the predetermined operation plan.

5. The information processing apparatus according to claim 2, wherein the preparation tasks include charging of the first vehicle, and the predetermined condition specifies that the charging should be omitted when a start time of the charging is delayed from the predetermined operation plan, and an amount of charge of the first vehicle exceeds a predetermined value.

6. The information processing apparatus according to claim 1, wherein the predetermined condition includes a condition for reducing the execution time period of the one or more preparation tasks from what is originally planned.

7. The information processing apparatus according to claim 6, wherein the preparation tasks include vehicle interior cleaning of the first vehicle, and the predetermined condition specifies that the vehicle interior cleaning should be finished when the vehicle interior cleaning is completed to a predetermined level.

8. The information processing apparatus according to claim 6, wherein the preparation tasks include charging of the first vehicle, and the predetermined condition specifies that the charging should be finished when an amount of charge of the first vehicle exceeds a predetermined value.

9. An information processing method comprising:

generating, by a controller, a first command to a first vehicle that is an autonomous driving vehicle, based on a predetermined operation plan including an operation zone for providing a predetermined service including any one of a passenger transport service, a package transport service, a package storage service and a mobile shop service, and a non-operation zone for executing one or more preparation tasks including at least one of interior cleaning of the first vehicle, standby of the first vehicle at a vehicle site and charging of the first vehicle, the non-operation zone being scheduled to follow the operation zone in the predetermined operation plan;

causing transmission, by the controller, of the first command to the first vehicle to cause the first vehicle to travel autonomously to provide the predetermined service based on the predetermined operation plan of the first command, wherein the first vehicle is controlled according to the first command;

receiving, by the controller, at a predetermined time period, vehicle data transmitted from the first vehicle, the vehicle data including at least a processing state of tasks of the predetermined service and the one or more preparation tasks which are included in the predetermined operation plan;

determining, by the controller, whether the first vehicle has entered the non-operation zone from the operation zone based on the processing state of tasks included in the vehicle data;

in response to a determined entry of the first vehicle in the non-operation zone from the operation zone, determining, by the controller, whether the predetermined operation plan is delayed due to a delay having occurred in the operation zone with respect to the first vehicle entering the non-operation zone from the operation zone, based on the processing state of tasks;

correcting, by the controller, an execution plan of the one or more preparation tasks included in the predetermined operation plan by omitting execution of the one or more preparation tasks or by reducing an execution time period of the one or more preparation tasks from what is originally planned, based on a predetermined condition so as to reduce a time period during which the first vehicle stays in the non-operation zone when the predetermined operation plan is delayed due to the delay having occurred in the operation zone;

generating, by the controller, a second command based on a corrected operation plan including the corrected execution plan; and causing transmission, by the controller, of the second command to the first vehicle to cause the first vehicle to travel autonomously to execute the corrected execution plan based on the corrected operation plan of the second command, wherein the first vehicle is controlled according to the second command.

10. The information processing method according to claim 9, wherein the predetermined condition includes a condition for omitting the execution of the one or more preparation tasks.

11. The information processing method according to claim 10, wherein the preparation tasks include vehicle interior cleaning of the first vehicle, and the predetermined condition specifies that the vehicle interior cleaning should be omitted when a start time of the vehicle interior cleaning is delayed from the predetermined operation plan.

12. The information processing method according to claim 10, wherein the preparation tasks include standby of the first vehicle at the vehicle site, and the predetermined condition specifies that the standby should be omitted when a start time of the standby is delayed from the predetermined operation plan.

13. The information processing method according to claim 10, wherein the preparation tasks include charging of the first vehicle, and the predetermined condition specifies that the charging should be omitted when a start time of the charging is delayed from the predetermined operation plan, and an amount of charge of the first vehicle exceeds a predetermined value.

14. The information processing method according to claim 9, wherein the predetermined condition includes a condition for reducing the execution time period of the one or more preparation tasks from what is originally planned.

15. The information processing method according to claim 14, wherein the preparation tasks include vehicle interior cleaning of the first vehicle, and the predetermined condition specifies that the vehicle interior cleaning should be finished when the vehicle interior cleaning is completed to a predetermined level.

16. The information processing method according to claim 14, wherein the preparation tasks include charging of the first vehicle, and the predetermined condition specifies that the charging should be finished when an amount of charge of the first vehicle exceeds a predetermined value.

17. A non-transitory computer readable storing medium recording a computer program for causing a computer to perform an information processing method according to claim 9.

18. An information processing system, comprising:

a first information processing apparatus that manages a first vehicle; and a second information processing apparatus mounted on the first vehicle, wherein the first information processing apparatus is programmed to:

generate a first command to the second information processing apparatus, based on a predetermined operation plan that includes an operation zone for providing a predetermined service including any one of a passenger transport service, a package transport service, a package storage service and a mobile shop service, and a non-operation zone for executing one or more preparation tasks including at least one of interior cleaning of the first vehicle, standby of the first vehicle at a vehicle site and charging of the first vehicle, the non-operation zone being scheduled to follow the operation zone in the predetermined operation plan;

transmit the first command to the second information processing apparatus to cause the first vehicle to travel autonomously to provide the predetermined service based on the predetermined operation plan of the first command, wherein the first vehicle is controlled according to the first command;

receive, at a predetermined time period, vehicle data transmitted from the second information processing apparatus, the vehicle data including at least a processing state of tasks of the predetermined service and the one or more preparation tasks included in the predetermined operation plan;

determine whether the first vehicle has entered the non-operation zone from the operation zone based on the processing state of tasks included in the vehicle data;

in response to a determined entry of the first vehicle in the non-operation zone from the operation zone, determine whether the predetermined operation plan is delayed due to a delay having occurred in the operation zone with respect to the first vehicle entering the non-operation zone from the operation zone, based on the processing state of tasks;

correct an execution plan of the one or more preparation tasks included in the predetermined operation plan by omitting execution of the one or more preparation tasks or by reducing an execution time period of the one or more preparation tasks from what is originally planned, based on a predetermined condition so as to reduce a time period during which the first vehicle stays in the non-operation zone when the predetermined operation plan is delayed due to the delay having occurred in the operation zone;

generate a second command based on a corrected operation plan including the corrected execution plan, to the second information processing apparatus; and transmit the second command to the second information processing apparatus; and the second information processing apparatus is programmed to:

cause the first vehicle to travel autonomously to execute the corrected execution plan based on the corrected operation plan of the second command, wherein the first vehicle is controlled according to the second command.

19. The information processing system according to claim 18, wherein the predetermined condition includes a condition for omitting the execution of the one or more preparation tasks.

20. The information processing system according to claim 18, wherein the predetermined condition includes a condition for reducing an execution time period of the one or more preparation tasks from what is originally planned.

\* \* \* \* \*